(12) United States Patent
Chang et al.

(10) Patent No.: US 12,278,341 B2
(45) Date of Patent: Apr. 15, 2025

(54) ELECTRODE ASSEMBLY, BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Wen Chang, Ningde (CN); Chenghua Fu, Ningde (CN); Suogang Guo, Ningde (CN); Yonghuang Ye, Ningde (CN); Chang Zhu, Ningde (CN); Yan Zhang, Ningde (CN); Wenge Han, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/819,605

(22) Filed: Aug. 29, 2024

(65) Prior Publication Data

US 2024/0421361 A1 Dec. 19, 2024

Related U.S. Application Data

(63) Continuation of application No. PCT/CN2023/078466, filed on Feb. 27, 2023.

(30) Foreign Application Priority Data

Apr. 29, 2022 (CN) .......................... 202221023643.4

(51) Int. Cl.
*H01M 10/058* (2010.01)
*H01M 10/04* (2006.01)
(Continued)

(52) U.S. Cl.
CPC ... *H01M 10/0587* (2013.01); *H01M 10/0431* (2013.01); *H01M 10/0525* (2013.01); *H01M 10/058* (2013.01); *H01M 50/538* (2021.01)

(58) Field of Classification Search
CPC ........... H01M 10/0431; H01M 10/058; H01M 10/0587; H01M 10/125; H01M 10/286; H01M 50/538; H01M 10/052
See application file for complete search history.

(56) References Cited

U.S. PATENT DOCUMENTS

2002/0122975 A1    9/2002   Spillman et al.
2014/0011062 A1*   1/2014   Lee ................... H01M 10/0431
                                                                     429/94

(Continued)

FOREIGN PATENT DOCUMENTS

CN      101707262 A     5/2010
CN      101834318 A     9/2010
(Continued)

OTHER PUBLICATIONS

Liu (CN 101834318) machine translation with original attached (Year: 2010).*

(Continued)

*Primary Examiner* — Jeremiah R Smith
(74) *Attorney, Agent, or Firm* — ANOVA LAW GROUP, PLLC

(57) ABSTRACT

An electrode assembly includes a negative electrode plate, a positive electrode plate, and a separator disposed between the negative electrode plate and the positive electrode plate. The negative electrode plate, the positive electrode plate, and the separator are wound together around a winding axis to form the electrode assembly. The negative electrode plate is a continuous negative electrode plate extending from a foremost winding end to a hindmost winding end along a winding direction. The positive electrode plate includes a continuous positive electrode plate disposed along the winding direction as well as a single-sheet positive electrode plate and/or a long-sheet positive electrode plate disposed (Continued)

along the winding direction apart from the continuous positive electrode plate.

17 Claims, 3 Drawing Sheets

(51) Int. Cl.
*H01M 10/0525* (2010.01)
*H01M 10/0587* (2010.01)
*H01M 50/538* (2021.01)

(56) References Cited

U.S. PATENT DOCUMENTS

| | | | |
|---|---|---|---|
| 2018/0108933 A1* | 4/2018 | Nagaya | H01M 10/049 |
| 2019/0044097 A1* | 2/2019 | Yu | H01M 50/46 |
| 2019/0267579 A1* | 8/2019 | Kawai | H01M 50/54 |
| 2020/0044234 A1* | 2/2020 | Zeng | H01M 10/0525 |

FOREIGN PATENT DOCUMENTS

| | | |
|---|---|---|
| CN | 111244528 A | 6/2020 |
| CN | 112670597 A | 4/2021 |
| CN | 214254506 U | 9/2021 |
| CN | 217740566 U | 11/2022 |

OTHER PUBLICATIONS

The World Intellectual Property Organization (WIPO) International Search Report and Written Opinion for PCT/CN2023/078466 Apr. 12, 2023 15 Pages (including translation).
State Intellectual Property Office of China Notice of Grant of Invention Patent Right for Application No. 202221023643.4 Aug. 12, 2022 2 pages (including translation).
The European Patent Office (EPO) The Extended European Search Report for Application No. 23794737.9 Oct. 14, 2024 10 Pages.

* cited by examiner

ELECTRODE ASSEMBLY, BATTERY CELL, BATTERY, AND ELECTRICAL DEVICE

CROSS-REFERENCE TO RELATED APPLICATIONS

This application is a continuation of International Application No. PCT/CN2023/078466, filed on Feb. 27, 2023, which claims priority to Chinese Patent Application No. 202221023643.4, filed on Apr. 29, 2022, the entire contents of both of which are incorporated herein.

TECHNICAL FIELD

This application relates to the field of batteries, and in particular, to an electrode assembly, a battery cell, a battery, and an electrical device.

BACKGROUND

Energy conservation and emission reduction are key to sustainable development of the automobile industry. Electric vehicles have become an important part of the sustainable development of the automobile industry by virtue of energy saving and environmental friendliness. Battery technology is crucial to development of electric vehicles.

Existing lithium-ion batteries largely employ a jelly-roll electrode assembly. However, in a jelly-roll electrode assembly, the active material layer on the inner side of the innermost negative electrode is usually left unused, thereby imposing a limitation on the maximal exertion of the energy density of a lithium-ion battery.

SUMMARY

In view of the above problem, this application provides an electrode assembly, a battery cell, a battery, and an electrical device to effectively improve the energy density of the electrode assembly and the battery.

According to a first aspect, this application provides an electrode assembly. The electrode assembly includes a negative electrode plate, a positive electrode plate, and a separator disposed between the negative electrode plate and the positive electrode plate. The negative electrode plate, the positive electrode plate, and the separator are wound together around a winding axis to form the electrode assembly.

The negative electrode plate is a continuous negative electrode plate extending from a foremost winding end to a hindmost winding end along a winding direction.

The positive electrode plate includes a continuous positive electrode plate disposed along the winding direction as well as a single-sheet positive electrode plate and/or a long-sheet positive electrode plate disposed along the winding direction apart from the continuous positive electrode plate.

In some embodiments of the electrode assembly, at least one single-sheet positive electrode plate is disposed. The at least one single-sheet positive electrode plate is separate from the continuous positive electrode plate along the winding direction.

In some embodiments of the electrode assembly, one or more single-sheet positive electrode plates are disposed. At least one single-sheet positive electrode plate is located upstream and/or downstream of the continuous positive electrode plate along the winding direction.

In some embodiments of the electrode assembly, the long-sheet positive electrode plate is located downstream of the continuous positive electrode plate along the winding direction.

In some embodiments of the electrode assembly, the continuous negative electrode plate includes a first negative straight portion and a second negative straight portion that extend from the foremost winding end along the winding direction. The first negative straight portion and the second negative straight portion are connected by a first negative corner portion and opposite to each other.

The single-sheet positive electrode plate includes a first positive electrode plate. The first positive electrode plate is disposed in a clearance formed between the first negative straight portion and the second negative straight portion.

The first positive electrode plate may be a double-sided electrode plate. In other words, both sides of a current collector of the electrode plate are coated with an active material layer. The active material layers on the two sides of the current collector of the first positive electrode plate are opposite to the inward-facing active material layers on the first negative straight portion and the second negative straight portion, respectively. In this way, the inward-facing active material layers on the first negative straight portion and the second negative straight portion can be utilized rather than wasted, thereby improving the energy density of the electrode assembly effectively.

In addition, the first positive electrode plate is in the form of a single-sheet positive electrode plate, thereby eliminating the relevant corner portions, and eliminating the above defects that may exist in the corner portions. In other words, the possibility of breakage of the corner portion or detachment of the active material layer is eliminated, thereby avoiding lithium plating at the innermost corner.

In some embodiments of the electrode assembly, the first positive electrode plate includes:
  a current collector, where the current collector includes a metal layer; and
  an active material layer, where the active material layer is applied onto both sides of the current collector and covers the metal layer, and the active material layer is opposite to the first negative straight portion and the second negative straight portion separately.

In some embodiments of the electrode assembly, the first positive electrode plate includes:
  a current collector, where the current collector includes a metal layer and a non-conductive base film layer, and the metal layer is disposed on both sides of the base film layer; and
  an active material layer, where the active material layer is applied onto the metal layers on both sides of the base film layer, and the active material layer is opposite to the first negative straight portion and the second negative straight portion separately.

In forming the first positive electrode plate by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the first positive electrode plate is exposed, thereby reducing the risk of a short circuit.

In some embodiments of the electrode assembly, a length of the first positive electrode plate is less than a length of the second negative straight portion. In this way, it is convenient and easy to insert the first positive electrode plate between the first negative straight portion and the second negative straight portion, and it is avoided that the electrode plate is unduly long and bends into a corner.

In some embodiments of the electrode assembly, the first positive electrode plate includes two end surfaces and four side surfaces. The two end surfaces are opposite to the first negative straight portion and the second negative straight portion respectively. At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

In some embodiments of the electrode assembly, the continuous negative electrode plate further includes a third negative straight portion extending along the winding direction. The third negative straight portion is connected to the second negative straight portion by a second negative corner portion. The single-sheet positive electrode plate further includes a second positive electrode plate. The second positive electrode plate is disposed in a clearance formed between the first negative straight portion and the third negative straight portion.

The second positive electrode plate is in the form of a single-sheet positive electrode plate, thereby eliminating the relevant corner portions, and eliminating the above defects that may exist in the corner portions. In other words, the possibility of breakage of the corner portion or detachment of the active material layer is eliminated.

In addition, the existence of the second positive electrode plate leads to formation of an anode-wrapped-in-anode structure at the in-situ position of the first positive corner portion, and leads to formation of an anode-wrapped-in-anode corner clearance. The anode-wrapped-in-anode structure eliminates the problem of lithium plating, thereby eliminating the risk of lithium plating that may occur at the corner portion.

In some embodiments of the electrode assembly, the second positive electrode plate includes:
  a current collector, where the current collector includes a metal layer; and
  an active material layer, where the active material layer is applied onto both sides of the current collector and covers the metal layer, and the active material layer is opposite to the first negative straight portion and the third negative straight portion separately.

In some embodiments of the electrode assembly, the second positive electrode plate includes:
  a current collector, where the current collector includes a metal layer and a non-conductive base film layer, and the metal layer is disposed on both sides of the base film layer; and
  an active material layer, where the active material layer is applied onto both sides of the base film layer and covers the metal layer, and the active material layer is opposite to the first negative straight portion and the third negative straight portion separately.

In forming the second positive electrode plate by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the second positive electrode plate is exposed, thereby reducing the risk of a short circuit.

In some embodiments of the electrode assembly, a length of the second positive electrode plate is less than a length of the second negative straight portion, thereby maximally utilizing the space between the first negative straight portion and the third negative straight portion, and ensuring a relatively high energy density of the electrode assembly.

In some embodiments of the electrode assembly, the second positive electrode plate includes two end surfaces and four side surfaces. The two end surfaces are opposite to the first negative straight portion and the third negative straight portion respectively. At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

In some embodiments of the electrode assembly, the continuous negative electrode plate further includes a fourth negative straight portion extending along the winding direction. The fourth negative straight portion is connected to the third negative straight portion by a third negative corner portion. The single-sheet positive electrode plate further includes a third positive electrode plate. The third positive electrode plate is disposed in a clearance formed between the second negative straight portion and the fourth negative straight portion.

The third positive electrode plate is in the form of a single-sheet positive electrode plate, thereby eliminating the relevant corner portions, and eliminating the above defects that may exist in the corner portions. In other words, the possibility of breakage of the corner portion or detachment of the active material layer is eliminated.

In addition, the existence of the third positive electrode plate leads to formation of an anode-wrapped-in-anode structure at the in-situ position of the second positive corner portion, and leads to formation of an anode-wrapped-in-anode corner clearance. The anode-wrapped-in-anode structure eliminates the problem of lithium plating, thereby eliminating the risk of lithium plating that may occur at the corner portion.

In some embodiments of the electrode assembly, the third positive electrode plate includes:
  a current collector, where the current collector includes a metal layer; and
  an active material layer, where the active material layer is applied onto both sides of the current collector and covers the metal layer, and the active material layer is opposite to the second negative straight portion and the fourth negative straight portion separately.

In some embodiments of the electrode assembly, the third positive electrode plate includes:
  a current collector, where the current collector includes a metal layer and a non-conductive base film layer, and the metal layer is disposed on both sides of the base film layer; and
  an active material layer, where the active material layer is applied onto both sides of the base film layer and covers the metal layer, and the active material layer is opposite to the second negative straight portion and the fourth negative straight portion separately.

In forming the third positive electrode plate by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the third positive electrode plate is exposed, thereby reducing the risk of lithium plating.

In some embodiments of the electrode assembly, a length of the third positive electrode plate is less than a length of the second negative straight portion, thereby maximally utilizing the space between the second negative straight portion and the fourth negative straight portion, and ensuring a relatively high energy density of the electrode assembly.

In some embodiments of the electrode assembly, the third positive electrode plate includes two end surfaces and four side surfaces. The two end surfaces are opposite to the second negative straight portion and the fourth negative straight portion respectively. At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

In some embodiments of the electrode assembly, the single-sheet positive electrode plate includes an outermost positive electrode plate. The outermost positive electrode plate is disposed at an outermost coil of the electrode assembly along a radial direction perpendicular to the winding axis.

In some embodiments of the electrode assembly, the continuous negative electrode plate includes a last negative straight portion extending to the hindmost winding end along the winding direction. The outermost positive electrode plate includes a first outermost positive electrode plate. The first outermost positive electrode plate is disposed outside the last negative straight portion along the radial direction perpendicular to the winding axis.

The first outermost positive electrode plate may be a single-sided electrode plate. In other words, only one side of a current collector of the electrode plate is coated with an active material layer. The active material layer on the inner side of the current collector of the first outermost positive electrode plate is opposite to the active material layer on the outer side of the last negative straight portion. In this way, the active material layer on the outer side of the last negative straight portion can be utilized rather than wasted, thereby improving the energy density of the electrode assembly effectively.

In some embodiments of the electrode assembly, the first outermost positive electrode plate includes:
a current collector, where the current collector includes a metal layer; and
an active material layer, where the active material layer is applied onto a side of the current collector and covers the metal layer, the side being oriented toward the last negative straight portion.

In some embodiments of the electrode assembly, the first outermost positive electrode plate includes:
a current collector, where the current collector includes a metal layer and a non-conductive base film layer, and the metal layer is disposed on a side of the base film layer, the side being oriented toward the last negative straight portion; and
an active material layer, where the active material layer is applied onto a side of the base film layer and covers the metal layer, the side being oriented toward the last negative straight portion.

In forming the first outermost positive electrode plate by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the first outermost positive electrode plate is exposed, thereby reducing the risk of lithium plating.

In some embodiments of the electrode assembly, a length of the first outermost positive electrode plate is greater than a length of the last negative straight portion but less than a width of the electrode assembly, thereby maximally covering the last negative straight portion to maximally utilize the outward-facing active material layer on the last negative straight portion and ensure a relatively high energy density of the electrode assembly.

In some embodiments of the electrode assembly, the first outermost positive electrode plate includes two end surfaces and four side surfaces. The two end surfaces are opposite to each other. One of the two end surfaces is overlaid with an active material layer. The active material layer is oriented toward the last negative straight portion. At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

In some embodiments of the electrode assembly, the continuous negative electrode plate includes a next last negative straight portion extending along the winding direction. The next last negative straight portion is connected to the last negative straight portion by a last negative corner portion. The outermost positive electrode plate includes a second outermost positive electrode plate. The second outermost positive electrode plate is disposed outside the next last negative straight portion along the radial direction perpendicular to the winding axis.

The second outermost positive electrode plate may be a single-sided electrode plate. In other words, only one side of a current collector of the electrode plate is coated with an active material layer. The active material layer on the inner side of the current collector of the second outermost positive electrode plate is opposite to the active material layer on the outer side of the next last negative straight portion. In this way, the active material layer on the outer side of the next last negative straight portion can be utilized rather than wasted, thereby improving the energy density of the electrode assembly effectively.

In some embodiments of the electrode assembly, the second outermost positive electrode plate includes:
a current collector, where the current collector includes a metal layer; and
an active material layer, where the active material layer is applied onto a side of the current collector and covers the metal layer, the side being oriented toward the next last negative straight portion.

In some embodiments of the electrode assembly, the second outermost positive electrode plate includes:
a current collector, where the current collector includes a metal layer and a non-conductive base film layer, and the metal layer is disposed on a side of the base film layer, the side being oriented toward the next last negative straight portion; and an active material layer, where the active material layer is applied onto a side of the base film layer and covers the metal layer, the side being oriented toward the next last negative straight portion.

In forming the second outermost positive electrode plate by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the second outermost positive electrode plate is exposed, thereby reducing the risk of lithium plating.

In some embodiments of the electrode assembly, a length of the second outermost positive electrode plate is greater than a length of the next last negative straight portion but less than a width of the electrode assembly, thereby maximally covering the next last negative straight portion to maximally utilize the outward-facing active material layer on the next last negative straight portion and ensure a relatively high energy density of the electrode assembly.

In some embodiments of the electrode assembly, the second outermost positive electrode plate includes two end surfaces and four side surfaces. The two end surfaces are opposite to each other. One of the two end surfaces is overlaid with an active material layer. The active material layer is oriented toward the next last negative straight portion. At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

In some embodiments of the electrode assembly, the long-sheet positive electrode plate is disposed at an outermost coil of the electrode assembly along a radial direction perpendicular to the winding axis.

In some embodiments of the electrode assembly, the continuous negative electrode plate includes a last negative straight portion extending to the hindmost winding end along the winding direction. The continuous negative electrode plate further includes a next last negative straight portion extending along the winding direction. The next last negative straight portion is connected to the last negative straight portion by a last negative corner portion. The long-sheet positive electrode plate is disposed outside the last negative straight portion and the next last negative straight portion along the radial direction perpendicular to the winding axis.

The long-sheet positive electrode plate may be a single-sided electrode plate. In other words, only one side of a current collector of the electrode plate is coated with an active material layer. The active material layer on the inner side of the current collector of the long-sheet positive electrode plate is opposite to the active material layers on the outer sides of the last negative straight portion and the next last negative straight portion. In this way, the active material layers on the outer sides of the last negative straight portion and the next last negative straight portion can be utilized rather than wasted, thereby improving the energy density of the electrode assembly effectively.

In some embodiments of the electrode assembly, the long-sheet positive electrode plate includes:

a current collector, where the current collector includes a metal layer; and an active material layer, where the active material layer is applied onto a side of the current collector and covers the metal layer, the side being oriented toward the last negative straight portion and the next last negative straight portion.

In some embodiments of the electrode assembly, the long-sheet positive electrode plate includes:

a current collector, where the current collector includes a metal layer and a non-conductive base film layer, and the metal layer is disposed on a side of the base film layer, the side being oriented toward the last negative straight portion and the next last negative straight portion; and an active material layer, where the active material layer is applied onto a side of the base film layer and covers the metal layer, the side being oriented toward the last negative straight portion and the next last negative straight portion.

In forming the long-sheet positive electrode plate by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the long-sheet positive electrode plate is exposed, thereby reducing the risk of lithium plating.

In some embodiments of the electrode assembly, a length of the long-sheet positive electrode plate is greater than a sum of lengths of the last negative straight portion and the next last negative straight portion but less than twice a width of the electrode assembly, thereby maximally covering the last negative straight portion and the next last negative straight portion to maximally utilize the outward-facing active material layers on the last negative straight portion and the next last negative straight portion and ensure a relatively high energy density of the electrode assembly.

In some embodiments of the electrode assembly, the long-sheet positive electrode plate includes two end surfaces and four side surfaces. The two end surfaces are opposite to each other. One of the two end surfaces is overlaid with an active material layer. The active material layer is oriented toward the last negative straight portion and the next last negative straight portion. At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

According to a second aspect, this application provides a battery cell. The battery cell includes a housing and the electrode assembly disclosed above. The electrode assembly is disposed in the housing.

According to a third aspect, this application provides a battery. The battery includes the battery cell disclosed in the foregoing embodiment.

According to a fourth aspect, this application provides an electrical device. The electrical device includes the battery cell and/or battery disclosed in the foregoing embodiment and configured to provide electrical energy for the electrical device.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BRIEF DESCRIPTION OF DRAWINGS

By reading the following detailed description of exemplary embodiments, a person of ordinary skill in the art becomes clearly aware of various other advantages and benefits. The drawings are merely intended to illustrate the exemplary embodiments, but not to limit this application. In all the drawings, the same reference numeral represents the same component. In the drawings.

Figure 1:
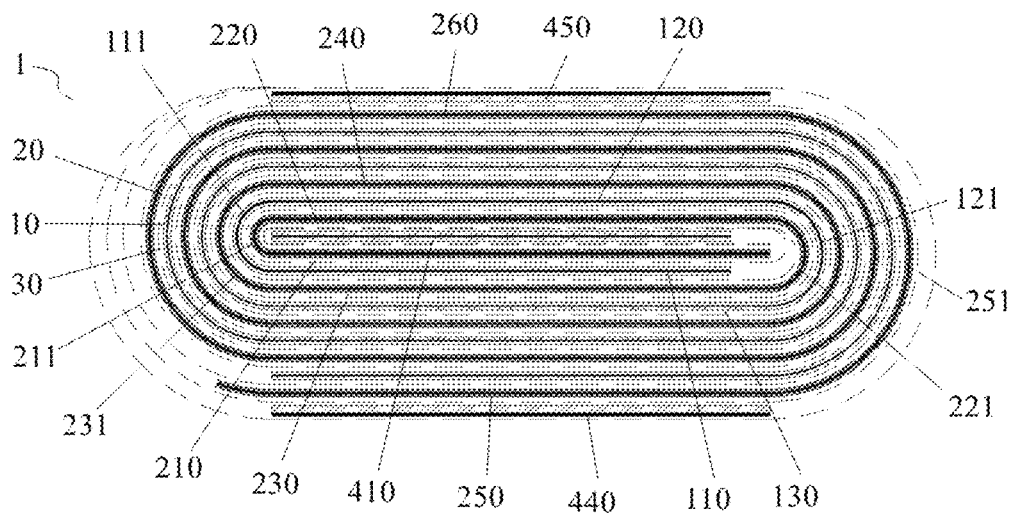
FIG. 1 is a schematic structural diagram of an electrode assembly according to some embodiments of this application.

LIST OF REFERENCE NUMERALS electrode assembly 1;
positive electrode plate 10; first positive straight portion 110; first positive corner portion 111; anode-wrapped-in-anode corner clearance 111A; second positive straight portion 120; second positive corner portion 121; anode-wrapped-in-anode corner clearance 121A; third positive straight portion 130;
negative electrode plate 20; first negative straight portion 210; first negative corner portion 211; second negative straight portion 220; second negative corner portion 221; third negative straight portion 230; third negative corner portion 231; fourth negative straight portion 240; last negative straight portion 250; last negative corner portion 251; next last negative straight portion 260;
separator 30;
first positive electrode plate 410; second positive electrode plate 420; third positive electrode plate 430; first outermost positive electrode plate 440; second outermost positive electrode plate 450; long-sheet positive electrode plate 460; last positive straight portion 462; next last positive straight portion 464; last positive corner portion 463; next last positive corner portion 465.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of some embodiments of this application, the technical terms "first" and "second" are merely intended to distinguish between different items but not intended to indicate or imply relative importance or implicitly specify the number of the indicated technical features, specific order, or order of precedence. In the description of some embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of this application, unless otherwise expressly specified and defined, the technical terms such as "mount", "concatenate", "connect", and "fix" are generic in a broad sense, for example, mean a fixed connection, a detachable connection, or a one-piece configuration; or mean a mechanical connection or an electrical connection; or mean a direct connection or an indirect connection implemented through an intermediary; or mean internal communication between two components or interaction between two components. A person of ordinary skill in the art can understand the specific meanings of the terms in some embodiments of this application according to specific situations.

Currently, as can be seen from the market trend, the application of power batteries is increasingly extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps soaring with the increase of the application fields of the power batteries.

Power batteries are usually lithium-ion batteries. Existing lithium-ion batteries largely employ a jelly-roll electrode assembly. The jelly-roll electrode assembly exhibits many advantages such as a compact structure, convenient processing and assembling, and a high energy density.

A jelly-roll electrode assembly typically includes a negative electrode plate, a positive electrode plate, and a separator disposed between the negative electrode plate and the positive electrode plate. The negative electrode plate, the positive electrode plate, and the separator are wound together around a winding axis to form a jelly-roll structure. In an actual operation process, the winding operation is usually performed by using a winding needle. To be specific, the negative electrode plate, the positive electrode plate, and the separator are wound together around the winding needle. The winding needle is drawn out upon completion of the winding.

However, with respect to a jelly-roll electrode assembly, because the winding needle needs to be drawn out after completion of the winding, the inner side of the innermost negative electrode plate is left blank, without being coated with an active material layer. The space at this position is not utilized, thereby resulting in a waste and a limitation on the maximal exertion of the energy density of the lithium-ion battery.

Moreover, the positive electrode plate and the negative electrode plate for forming the jelly-roll electrode assembly are typically in the form of double-sided electrode plates. In other words, both sides of a current collector of the electrode plate are coated with an active material layer. In this case, the active material layer on the outer side of the outermost negative electrode is usually left unused, thereby also imposing a limitation on the maximal exertion of the energy density of the lithium-ion battery.

In addition, for a jelly-roll electrode assembly, after the winding needle is drawn out, due to the lack of a support structure in the innermost coil, the innermost negative electrode plate is indented inward, thereby increasing an anode-wrapped-in-cathode corner clearance, making the corner area of the positive electrode larger than that of the negative electrode, and in turn, posing a risk of lithium plating.

Therefore, this application provides an electrode assembly and a battery containing the electrode assembly to overcome the above defects in the related art and maximize the energy density of the lithium-ion battery.

The electrode assembly disclosed in an embodiment of this application is applicable to, but not limited to use in, electrical devices such as a vehicle, watercraft, or aircraft. A power supply system of the electrical device may be made up by using the electrode assembly or battery or the like disclosed in this application, so as to increase the energy density of the battery.

The battery provided in an embodiment of this application may be used as a power supply of the electrical device. The electrical device may be, but is not limited to, a mobile phone, a tablet, a laptop computer, an electric toy, an electric tool, an electric power cart, an electric vehicle, a ship, a spacecraft, or the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

Figure 2:
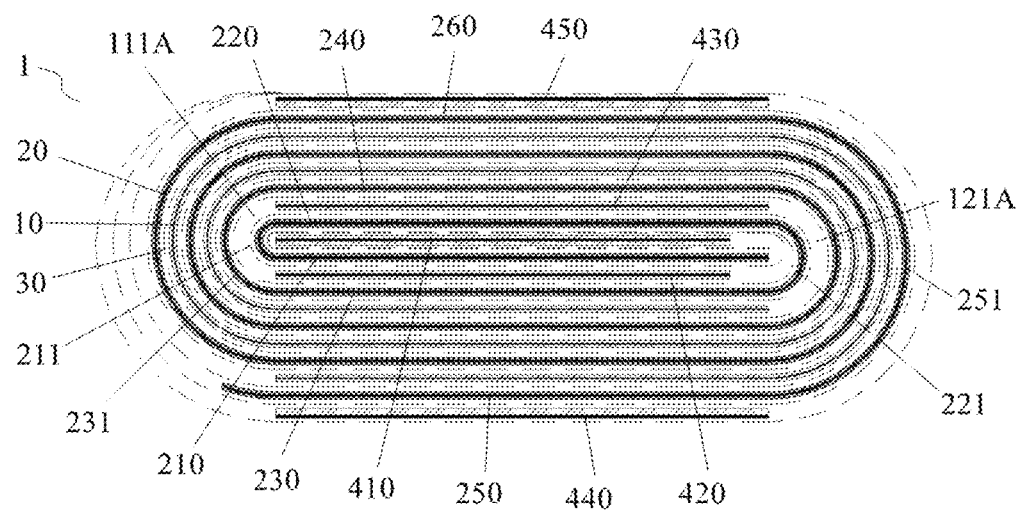
FIG. 2 is a schematic structural diagram of an electrode assembly according to some embodiments of this application.

According to some embodiments of this application, referring to FIG. 1 and FIG. 2, this application provides an electrode assembly 1. FIG. 1 and FIG. 2 show different embodiments of an electrode assembly 1 according to this application.

The electrode assembly 1 includes a positive electrode plate 10, a negative electrode plate 20, and a separator 30 disposed between the positive electrode plate 10 and the negative electrode plate 20. The positive electrode plate 10, the negative electrode plate 20, and the separator 30 are wound together around a winding axis to form the electrode assembly 1.

The positive electrode plate 10 includes a current collector and an active material layer applied on the current collector. Similarly, the negative electrode plate 20 includes a current collector and an active material layer applied on the current collector. Generally, the positive electrode plate 10 and the negative electrode plate 20 may be continuous double-sided electrode plates. "Continuous" herein means that the active material layer of the electrode plate is continuously applied on the current collector of the electrode plate. "Double-sided" herein means that the active material layer is applied on both sides of the current collector of the electrode plate.

The winding may be implemented by using a winding needle. The positive electrode plate 10, the negative electrode plate 20, and the separator 30 are stacked together. The winding needle is placed at a foremost winding end, and then the stacked structure is wound around the winding needle to form a jelly-roll structure in which the positive electrode plate 10 and the negative electrode plate 20 are alternately stacked and spaced apart by the separator 30. After completion of the winding, the winding needle may be drawn out. In a case of winding with the aid of a winding needle, the winding axis is typically located on the winding needle.

According to some embodiments of this application, the negative electrode plate 20 is a continuous negative electrode plate. A continuous negative electrode plate means a negative electrode plate on which a plurality of negative straight portions such as at least three negative straight portions are formed after an electrode assembly is formed by winding, where the negative straight portions are connected by corner portions in the electrode assembly to form a continuous configuration. This continuous negative electrode plate extends from the foremost winding end to the hindmost winding end along the winding direction. In other words, in the finally formed electrode assembly 1, the negative electrode plate 20 is continuous without interruption.

According to some embodiments of this application, the positive electrode plate 10 is a combined structure, and includes a continuous positive electrode plate and a single-sheet positive electrode plate and/or a long-sheet positive electrode plate. The continuous positive electrode plate means a positive electrode plate on which a plurality of positive straight portions such as at least three positive straight portions are formed after an electrode assembly is formed by winding, where the positive straight portions are connected by corner portions in the electrode assembly to form a continuous configuration. A single-sheet positive electrode plate means a positive electrode plate on which only one positive straight portion is formed after an electrode assembly is formed by winding. The single-sheet positive electrode plate may include a corner portion or no corner portion. A long-sheet positive electrode plate means a positive electrode plate on which two positive straight portions are formed after an electrode assembly is formed by winding, where the two positive straight portions are connected by a corner portion in the electrode assembly. The long-sheet positive electrode plate may include a corner portion or no corner portion at either end. The continuous positive electrode plate and the single-sheet positive electrode plate and/or the long-sheet positive electrode plate extend along the winding direction and are spaced apart from each other. The single-sheet positive electrode plate may be disposed at the foremost winding end and/or the hindmost winding end, or may be disposed near the foremost winding end and/or the hindmost winding end. The long-sheet positive electrode plate may be typically disposed at the hindmost winding end.

By designing the positive electrode plate 10 as a combined structure, the active material layer on the negative electrode plate at the foremost winding end and/or the hindmost winding end can be fully utilized rather than wasted, thereby improving the energy density of the electrode assembly 1 effectively.

According to some embodiments of this application, the number of single-sheet positive electrode plates may be at least one. The at least one single-sheet positive electrode plate is separate from the continuous positive electrode plate along the winding direction.

According to some embodiments of this application, one or more single-sheet positive electrode plates may be disposed. At least one single-sheet positive electrode plate is located upstream and/or downstream of the continuous positive electrode plate along the winding direction.

According to some embodiments of this application, the long-sheet positive electrode plate may be located downstream of the continuous positive electrode plate along the winding direction.

After the positive electrode plate 10, the negative electrode plate 20, and the separator 30 are wound together around the winding axis to form the electrode assembly 1, the negative electrode plate 20 includes a first negative straight portion 210 and a second negative straight portion 220 that extend from the foremost winding end along the winding direction. The first negative straight portion 210 and the second negative straight portion 220 are connected by a first negative corner portion 211 and opposite to each other. Generally, the first negative straight portion 210 and the second negative straight portion 220 may be parallel to each other instead. During the winding, the first negative straight portion 210 and the second negative straight portion 220 are the straight portions closest to the winding needle in the negative electrode plate 20. Therefore, after the winding needle is drawn out, a clearance is generally formed between the first negative straight portion 210 and the second negative straight portion 220. At the clearance, no other components such as a part of the positive electrode plate are disposed.

Because no positive electrode part exists between the first negative straight portion 210 and the second negative straight portion 220, the inward-facing active material layers on the first negative straight portion 210 and the second negative straight portion 220 are not utilized, thereby being detrimental to maximal exertion of the energy density. As used herein, the terms "inside", "inner side", and "inward" generally mean a side oriented toward the center of the electrode assembly along the radial direction perpendicular to the winding axis, and the terms "outside", "outer side", and "outward" generally mean a side oriented away from the center of the electrode assembly along the radial direction perpendicular to the winding axis.

Therefore, according to some embodiments of this application, the single-sheet positive electrode plate in the positive electrode plate 10 may include a first positive electrode plate 410. The first positive electrode plate 410 is disposed in a clearance formed between the first negative straight portion 210 and the second negative straight portion 220 of the negative electrode plate 20, as shown in FIG. 1 and FIG. 2.

The first positive electrode plate 410 may be a double-sided electrode plate. In other words, both sides of a current collector of the electrode plate are coated with an active material layer. In a case that the first positive electrode plate 410 is disposed between the first negative straight portion 210 and the second negative straight portion 220 of the negative electrode plate 20, the active material layers on the two sides of the current collector of the first positive electrode plate 410 are opposite to the inward-facing active material layers on the first negative straight portion 210 and the second negative straight portion 220, respectively. In this way, the inward-facing active material layers on the first negative straight portion 210 and the second negative straight portion 220 can be utilized rather than wasted, thereby improving the energy density of the electrode assembly 1 effectively.

In addition, the electrode plate bends to form a corner portion when being wound. The part closer to the inner side of the jelly-roll structure is bent to a higher degree in the electrode plate, the probability of breakage at the resulting corner portion is higher, and the probability of detachment of the active material layer at the corner portion caused by the bending is higher. As shown in FIG. 1, in the electrode assembly 1 according to this application, the innermost positive electrode plate is the first positive electrode plate 410, and is a single-sheet positive electrode plate, and is spaced apart from the foremost winding end of the positive electrode plate 10. In other words, the first positive electrode plate 410 is not connected to the foremost winding end of the positive electrode plate 10. In the example shown in FIG. 1, similar to the negative electrode plate 20, the positive electrode plate 10 includes a first positive straight portion 110 that extends from the foremost winding end along the winding direction. The first positive straight portion 110 is spaced apart from the first positive electrode plate 410 rather than connected by a corner portion. Therefore, in the electrode assembly 1 according to this application, for the positive electrode plate, the innermost positive electrode plate includes no corner portion that usually exists in the related art, thereby eliminating the above defects that may exist in the innermost corner portion. In other words, the possibility of breakage of the corner portion or detachment of the active material layer is eliminated, thereby avoiding the risk of lithium plating caused by the existence of a positive electrode corner corresponding to the foremost winding end of the negative electrode.

According to some embodiments of this application, the first positive electrode plate 410 includes a current collector and an active material layer. The current collector may include a metal layer. The active material layer is applied on both sides of the current collector and covers the metal layer. The active material layers on the two sides of the current collector of the first positive electrode plate 410 are opposite to the first negative straight portion 210 and the second negative straight portion 220, respectively, and specifically, opposite to the inward-facing active material layers on the first negative straight portion 210 and the second negative straight portion 220, respectively.

Optionally, in some embodiments, the current collector may be a composite current collector containing a metal layer and a base film layer. The metal layer is disposed on both sides of the base film layer. The active material layer is applied on both sides of the base film layer and covers the metal layer. The active material layers on the two sides of the current collector of the first positive electrode plate 410 are opposite to the first negative straight portion 210 and the second negative straight portion 220, respectively, and specifically, opposite to the inward-facing active material layers on the first negative straight portion 210 and the second negative straight portion 220, respectively.

In forming the first positive electrode plate 410 by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the first positive electrode plate 410 is exposed, thereby reducing the risk of a short circuit.

According to some embodiments of this application, optionally, as shown in FIG. 1 and FIG. 2, the length of the first positive electrode plate 410 may be designed as less than a half of the circumference of the winding needle. The "length" here may be a dimension measured along a left-right direction on the page of FIG. 1 to FIG. 2.

During the winding, the first negative straight portion 210 and the second negative straight portion 220 are the straight portions closest to the winding needle in the negative electrode plate 20. The length of the first negative straight portion 210 and the length of the second negative straight portion 220 are approximately a half of the circumference of the winding needle. Therefore, the length of the first positive electrode plate 410 may be less than the length of the first negative straight portion 210 or the length of the second negative straight portion 220, so as to prevent the first positive electrode plate from bending into a corner due to the excessive length. In this way, no negative electrode exists and no lithium plating occurs at the corresponding position. In addition, this arrangement makes it convenient to insert the first positive electrode plate 410 between the first negative straight portion 210 and the second negative straight portion 220.

According to some embodiments of this application, optionally, the first positive electrode plate 410 may include two end surfaces and four side surfaces. The two end surfaces are opposite to the first negative straight portion 210 and the second negative straight portion 220 respectively. At least 95% of an area of at least three of the four side surfaces is overlaid with an insulation layer.

The ceramic slurry used for preparing the insulation layer includes at least a ceramic material, a binder, and a solvent. The mass percent of the ceramic material is 10 wt % to 70 wt %, the mass percent of the binder is 1 wt % to 5 wt %, and the viscosity of the ceramic slurry is 100 to 1000 mPa·s.

The ceramic material is one of hydrated alumina, magnesium oxide, silicon carbide, or silicon nitride. The binder is a combination of one or more of polyvinylidene difluoride, polyacrylate ester, methyl acrylate, ethyl acrylate, 2-methyl methacrylate, or 2-ethyl methacrylate. The solvent is N-methyl-pyrrolidone. The ceramic material is hydrated alumina. The binder is polyvinylidene difluoride.

Generally, a single-sheet electrode plate may assume a hexahedral shape, and therefore, include six surfaces. The two end surfaces of the first positive electrode plate 410 are opposite to the first negative straight portion 210 and the second negative straight portion 220 respectively. In other words, the two end surfaces are the surfaces coated with the active material layer, and the remaining four surfaces are the side surfaces.

At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

According to some embodiments of this application, optionally, as shown in FIG. 1 and FIG. 2, the negative electrode plate 20 further includes a third negative straight portion 230 extending along the winding direction. The third negative straight portion 230 is connected to the second negative straight portion 220 by a second negative corner portion 221. Generally, the third negative straight portion 230 is parallel to the first negative straight portion 210 and the second negative straight portion 220. The first negative straight portion 210 is located between the second negative straight portion 220 and the third negative straight portion 230.

As shown in FIG. 2, the single-sheet positive electrode plate in the positive electrode plate 10 may include a second positive electrode plate 420. The second positive electrode plate 420 is disposed in a clearance formed between the first negative straight portion 210 and the third negative straight portion 230.

The second positive electrode plate 420 may be a double-sided electrode plate. In other words, both sides of a current collector of the electrode plate are coated with an active material layer. In a case that the second positive electrode plate 420 is disposed between the first negative straight portion 210 and the third negative straight portion 230 of the negative electrode plate 20, the active material layers on the two sides of the current collector of the second positive electrode plate 420 are opposite to the inward-facing active material layers on the first negative straight portion 210 and the third negative straight portion 230, respectively.

The electrode plate bends to form a corner portion when being wound. The part closer to the inner side of the jelly-roll structure is bent to a higher degree in the electrode plate, the probability of breakage at the resulting corner portion is higher, and the probability of detachment of the active material layer at the corner portion caused by the bending is higher. In the example shown in FIG. 1, similar to the negative electrode plate 20, the positive electrode plate 10 includes a second positive straight portion 120 that extends from the foremost winding end along the winding direction. The second positive straight portion 120 is connected to the first positive straight portion 110 by a first positive corner portion 111. The first positive straight portion 110 and the second positive straight portion 120 may be parallel to each other. In the electrode assembly 1 shown in FIG. 2, the second positive electrode plate 420 is a single-sheet positive electrode plate, and is spaced apart from the foremost winding end of the positive electrode plate 10. In other words, the second positive electrode plate 420 is not connected to the foremost winding end of the positive electrode plate 10. Therefore, in the electrode assembly 1 shown in FIG. 2, the positive electrode plate includes no first positive corner portion 111 in contrast to the embodiment shown in FIG. 1, and the innermost corner portion is removed, thereby eliminating the above defects that may exist in the innermost corner portion. In other words, the possibility of breakage of the corner portion or detachment of the active material layer is eliminated.

On the other hand, for an existing jelly-roll electrode assembly, because the positive electrode plate and the negative electrode plate are wound continuously, the innermost corner portion is an anode-wrapped-in-cathode structure. An anode-wrapped-in-cathode corner clearance may be generated after the winding needle is drawn out, thereby posing a risk of lithium plating. As shown in FIG. 1, the first positive corner portion 111 is an anode-wrapped-in-cathode structure.

In contrast, in the electrode assembly 1 shown in FIG. 2, the first positive corner portion 111 shown in FIG. 1 does not exist. Therefore, an anode-wrapped-in-anode structure is formed at the in-situ position of the first positive corner portion 111, and an anode-wrapped-in-anode corner clearance 111A is formed. The anode-wrapped-in-anode structure eliminates the problem of lithium plating, thereby eliminating the risk of lithium plating that may occur at the corner portion.

According to some embodiments of this application, the second positive electrode plate 420 includes a current collector and an active material layer. The current collector may include a metal layer. The active material layer is applied on both sides of the current collector and covers the metal layer. The active material layers on the two sides of the current collector of the second positive electrode plate 420 are opposite to the first negative straight portion 210 and the third negative straight portion 230, respectively, and specifically, opposite to the inward-facing active material layers on the first negative straight portion 210 and the third negative straight portion 230, respectively.

Optionally, in some embodiments, the current collector may be a composite current collector containing a metal layer and a base film layer. The metal layer is disposed on both sides of the base film layer. The active material layer is applied on both sides of the base film layer and covers the metal layer. The active material layers on the two sides of the current collector of the second positive electrode plate 420 are opposite to the first negative straight portion 210 and the third negative straight portion 230, respectively, and specifically, opposite to the inward-facing active material layers on the first negative straight portion 210 and the third negative straight portion 230, respectively.

In forming the second positive electrode plate 420 by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the second positive electrode plate 420 is exposed, thereby reducing the risk of lithium plating.

According to some embodiments of this application, optionally, as shown in FIG. 2, the length of the second positive electrode plate 420 may be designed as equal to a half of the circumference of the winding needle. The "length" here may be a dimension measured along a left-right direction on the page of FIG. 2.

During the winding, the length of the first negative straight portion 210 and the length of the third negative straight portion 230 are approximately a half of the circumference of the winding needle. Therefore, the length of the second positive electrode plate 420 may be less than or equal to the length of the first negative straight portion 210, the length of the second negative straight portion 220, or the length of the third negative straight portion 230, thereby maximally utilizing the space between the first negative straight portion 210 and the third negative straight portion 230, and ensuring a relatively high energy density of the electrode assembly 1.

According to some embodiments of this application, optionally, the second positive electrode plate 420 may include two end surfaces and four side surfaces. The two end surfaces are opposite to the first negative straight portion 210 and the third negative straight portion 230 respectively. At least 95% of an area of at least three of the four side surfaces is overlaid with an insulation layer.

The ceramic slurry used for preparing the insulation layer includes at least a ceramic material, a binder, and a solvent. The mass percent of the ceramic material is 10 wt % to 70 wt %, the mass percent of the binder is 1 wt % to 5 wt %, and the viscosity of the ceramic slurry is 100 to 1000 mPa·s.

The ceramic material is one of hydrated alumina, magnesium oxide, silicon carbide, or silicon nitride. The binder is a combination of one or more of polyvinylidene difluoride, polyacrylate ester, methyl acrylate, ethyl acrylate, 2-methyl methacrylate, or 2-ethyl methacrylate. The solvent is N-methyl-pyrrolidone. The ceramic material is hydrated alumina. The binder is polyvinylidene difluoride.

Generally, a single-sheet electrode plate may assume a hexahedral shape, and therefore, include six surfaces. The two end surfaces of the second positive electrode plate 420 are opposite to the first negative straight portion 210 and the third negative straight portion 230 respectively. In other words, the two end surfaces are the surfaces coated with the active material layer, and the remaining four surfaces are the side surfaces.

At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

According to some embodiments of this application, optionally, as shown in FIG. 1 and FIG. 2, the negative electrode plate 20 further includes a fourth negative straight portion 240 extending along the winding direction. The fourth negative straight portion 240 is connected to the third negative straight portion 230 by a third negative corner portion 231. Generally, the fourth negative straight portion 240 may be parallel to the first negative straight portion 210, the second negative straight portion 220, and the third negative straight portion 230 instead. The second negative straight portion 220 is located between the first negative straight portion 210 and the fourth negative straight portion 240.

As shown in FIG. 2, the single-sheet positive electrode plate in the positive electrode plate 10 may further include a third positive electrode plate 430. The third positive electrode plate 430 is disposed in a clearance formed between the second negative straight portion 220 and the fourth negative straight portion 240.

The third positive electrode plate 430 may be a double-sided electrode plate. In other words, both sides of a current collector of the electrode plate are coated with an active material layer. In a case that the third positive electrode plate 430 is disposed between the second negative straight portion 220 and the fourth negative straight portion 240 of the negative electrode plate 20, the active material layers on the two sides of the current collector of the third positive electrode plate 430 are opposite to the inward-facing active material layers on the second negative straight portion 220 and the fourth negative straight portion 240, respectively.

The electrode plate bends to form a corner portion when being wound. The part closer to the inner side of the jelly-roll structure is bent to a higher degree in the electrode plate, the probability of breakage at the resulting corner portion is higher, and the probability of detachment of the active material layer at the corner portion caused by the bending is higher. In the example shown in FIG. 1, similar to the negative electrode plate 20, the positive electrode plate 10 includes a third positive straight portion 130 that extends from the foremost winding end along the winding direction. The third positive straight portion 130 is connected to the second positive straight portion 120 by a second positive corner portion 121. The third positive straight portion 130 is parallel to the first positive straight portion 110 and the second positive straight portion 120. In the electrode assembly 1 shown in FIG. 2, the third positive electrode plate 430 is a single-sheet positive electrode plate, and is spaced apart from the foremost winding end of the positive electrode plate 10. In other words, the third positive electrode plate 430 is not connected to the foremost winding end of the positive electrode plate 10. Therefore, in the electrode assembly 1 shown in FIG. 2, the positive electrode plate includes no second positive corner portion 121 in contrast to the embodiment shown in FIG. 1, and the inner corner portion is removed, thereby eliminating the above defects that may exist in the inner corner portion. In other words, the possibility of breakage of the corner portion or detachment of the active material layer is eliminated.

On the other hand, for an existing jelly-roll electrode assembly, because the positive electrode plate and the negative electrode plate are wound continuously, the innermost corner portion is an anode-wrapped-in-cathode structure. An anode-wrapped-in-cathode corner clearance may be generated after the winding needle is drawn out, thereby posing a risk of lithium plating. As shown in FIG. 1, the second positive corner portion 121 is an anode-wrapped-in-cathode structure.

In contrast, in the electrode assembly 1 shown in FIG. 2, the second positive corner portion 121 shown in FIG. 1 does not exist. Therefore, an anode-wrapped-in-anode structure is formed at the in-situ position of the second positive corner portion 121, and an anode-wrapped-in-anode corner clearance 121A is formed. The anode-wrapped-in-anode structure eliminates the problem of lithium plating, thereby eliminating the risk of lithium plating that may occur at the corner portion.

According to some embodiments of this application, the third positive electrode plate 430 includes a current collector and an active material layer. The current collector may include a metal layer. The active material layer is applied on both sides of the current collector and covers the metal layer. The active material layers on the two sides of the current collector of the third positive electrode plate 430 are opposite to the second negative straight portion 220 and the fourth negative straight portion 240, respectively, and specifically, opposite to the inward-facing active material layers on the second negative straight portion 220 and the fourth negative straight portion 240, respectively.

Optionally, the current collector may be a composite current collector containing a metal layer and a base film layer. The metal layer is disposed on both sides of the base film layer. The active material layer is applied on both sides of the base film layer and covers the metal layer. The active material layers on the two sides of the current collector of the third positive electrode plate 430 are opposite to the second negative straight portion 220 and the fourth negative straight portion 240, respectively, and specifically, opposite to the inward-facing active material layers on the second negative straight portion 220 and the fourth negative straight portion 240, respectively.

In forming the third positive electrode plate 430 by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the third positive electrode plate 430 is exposed, thereby reducing the risk of lithium plating.

According to some embodiments of this application, optionally, as shown in FIG. 2, the length of the third positive electrode plate 430 may be designed as equal to a half of the circumference of the winding needle. The "length" here may be a dimension measured along a left-right direction on the page of FIG. 2.

During the winding, the length of the second negative straight portion 220 and the length of the fourth negative straight portion 240 are approximately a half of the circumference of the winding needle. Therefore, the length of the third positive electrode plate 430 may be less than or equal to the length of the first negative straight portion 210, the length of the second negative straight portion 220, the length of the third negative straight portion 230, or the length of the fourth negative straight portion 240, thereby maximally utilizing the space between the second negative straight portion 220 and the fourth negative straight portion 240, and ensuring a relatively high energy density of the electrode assembly 1.

According to some embodiments of this application, optionally, the third positive electrode plate 430 may include two end surfaces and four side surfaces. The two end surfaces are opposite to the second negative straight portion 220 and the fourth negative straight portion 240 respectively. At least 95% of an area of at least three of the four side surfaces is overlaid with an insulation layer.

The ceramic slurry used for preparing the insulation layer includes at least a ceramic material, a binder, and a solvent. The mass percent of the ceramic material is 10 wt % to 70 wt %, the mass percent of the binder is 1 wt % to 5 wt %, and the viscosity of the ceramic slurry is 100 to 1000 mPa·s.

The ceramic material is one of hydrated alumina, magnesium oxide, silicon carbide, or silicon nitride. The binder is a combination of one or more of polyvinylidene difluoride, polyacrylate ester, methyl acrylate, ethyl acrylate, 2-methyl methacrylate, or 2-ethyl methacrylate. The solvent is N-methyl-pyrrolidone. The ceramic material is hydrated alumina. The binder is polyvinylidene difluoride.

Generally, a single-sheet electrode plate may assume a hexahedral shape, and therefore, include six surfaces. The two end surfaces of the third positive electrode plate 430 are opposite to the second negative straight portion 220 and the fourth negative straight portion 240 respectively. In other words, the two end surfaces are the surfaces coated with the active material layer, and the remaining four surfaces are the side surfaces.

At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

According to some embodiments of this application, the single-sheet positive electrode plate in the positive electrode plate 10 may include an outermost positive electrode plate. The outermost positive electrode plate is disposed at an outermost coil of the electrode assembly 1 along a radial direction perpendicular to the winding axis. By disposing the single-sheet positive electrode plate at the outermost coil of the electrode assembly 1, the active material layer on the outer side of the negative electrode plate at or near the hindmost winding end can be utilized rather than wasted, thereby improving the energy density of the electrode assembly 1 effectively. The outermost positive electrode plate is in some embodiments in the form of a single-sided electrode plate. In other words, the active material layer is applied on only one side of the current collector of the electrode plate. For example, the active material layer is applied on a side of the current collector of the electrode plate, the side being oriented toward the negative electrode plate, thereby fully utilizing the negative electrode plate at or near the hindmost winding end without causing a waste of the outermost positive electrode plate.

According to some embodiments of this application, optionally, as shown in FIG. 1 and FIG. 2, the negative electrode plate 20 includes a last negative straight portion 250 extending to the hindmost winding end along the winding direction. The last negative straight portion 250 is the outermost part of the negative electrode plate 20 in the electrode assembly 1.

As mentioned above, the negative electrode plate 20 is typically in the form of a double-sided electrode plate. Both sides of the current collector of the negative electrode plate are coated with an active material layer. Therefore, both sides of the last negative straight portion 250 of the negative electrode plate 20 are also coated with the active material layer. Because the last negative straight portion 250 is the outermost part of the negative electrode plate 20, the active material layer on the outer side of the last negative straight portion 250 is directly oriented toward the external environment and corresponds to no positive electrode, thereby resulting in failure to utilize the active material layer on the outer side of the last negative straight portion 250, and resulting in a waste.

In view of the above problem, the outermost positive electrode plate in the positive electrode plate 10 according to this application may include a first outermost positive electrode plate 440. The first outermost positive electrode plate 440 is disposed at the outer side of the last negative straight portion 250 along a radial direction perpendicular to the winding axis, as shown in FIG. 1 and FIG. 2.

The first outermost positive electrode plate 440 may be a single-sided electrode plate. In other words, only one side of the current collector of the electrode plate is coated with an active material layer. For example, the active material layer is applied on the inner side of the current collector of the first outermost positive electrode plate 440 (that is, on the side oriented toward the last negative straight portion 250). In a case that the first outermost positive electrode plate 440 is disposed outside the last negative straight portion 250, the active material layer on the inner side of the current collector of the first outermost positive electrode plate 440 is opposite to the active material layer on the outer side of the last negative straight portion 250. In this way, the active material layer on the outer side of the last negative straight portion 250 can be utilized rather than wasted, thereby improving the energy density of the electrode assembly 1 effectively.

According to some embodiments of this application, the first outermost positive electrode plate 440 includes a current collector and an active material layer. The current collector may include a metal layer. The active material layer is applied on one side of the current collector and covers the metal layer, the side being oriented toward the last negative straight portion 250. The active material layer on the side, oriented toward the last negative straight portion 250, of the current collector of the first outermost positive electrode plate 440, is opposite to the last negative straight portion 250, and specifically, opposite to the outward-facing active material layer on the last negative straight portion 250.

Optionally, the current collector may be a composite current collector containing a metal layer and a base film layer. The metal layer is disposed on a side of the base film layer, the side being oriented toward the last negative straight portion 250. The active material layer is applied onto a side of the base film layer and covers the metal layer, the side being oriented toward the last negative straight portion 250. The active material layer on the side, oriented toward the last negative straight portion 250, of the current collector of the first outermost positive electrode plate 440, is opposite to the last negative straight portion 250, and specifically, opposite to the outward-facing active material layer on the last negative straight portion 250.

In forming the first outermost positive electrode plate 440 by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the first outermost positive electrode plate 440 is exposed, thereby reducing the risk of lithium plating.

According to some embodiments of this application, optionally, as shown in FIG. 1 and FIG. 2, the length of the first outermost positive electrode plate 440 may be designed as greater than a half of the circumference of the winding needle but less than the width of the electrode assembly 1. The "length" here means a dimension measured along a left-right direction on the page of FIG. 1 and FIG. 2. The "width of the electrode assembly" is also a dimension of the electrode assembly measured along the left-right direction on the page of FIG. 1 and FIG. 2, and is a width of the electrode assembly in a conventional sense in this field.

The length of the first outermost positive electrode plate 440 is greater than a half of the circumference of the winding needle but less than the width of the electrode assembly 1, or the length of the first outermost positive electrode plate 440 may be greater than the length of the last negative straight portion 250 but less than the width of the electrode assembly 1, thereby maximally covering the last negative straight portion 250 to maximally utilize the outward-facing active material layer on the last negative straight portion 250 and ensure a relatively high energy density of the electrode assembly 1.

According to some embodiments of this application, optionally, the first outermost positive electrode plate 440 may include two end surfaces and four side surfaces. The two end surfaces are opposite to each other. One of the two end surfaces is overlaid with an active material layer oriented toward the last negative straight portion 250. At least 95% of an area of at least three of the four side surfaces is overlaid with an insulation layer.

The ceramic slurry used for preparing the insulation layer includes at least a ceramic material, a binder, and a solvent. The mass percent of the ceramic material is 10 wt % to 70 wt %, the mass percent of the binder is 1 wt % to 5 wt %, and the viscosity of the ceramic slurry is 100 to 1000 mPa·s.

The ceramic material is one of hydrated alumina, magnesium oxide, silicon carbide, or silicon nitride. The binder is a combination of one or more of polyvinylidene difluoride, polyacrylate ester, methyl acrylate, ethyl acrylate, 2-methyl methacrylate, or 2-ethyl methacrylate. The solvent is N-methyl-pyrrolidone. The ceramic material is hydrated alumina. The binder is polyvinylidene difluoride.

At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

According to some embodiments of this application, optionally, as shown in FIG. 1 and FIG. 2, the negative electrode plate 20 includes a next last negative straight portion 260 extending along the winding direction. The next last negative straight portion 260 is connected to the last negative straight portion 250 by a last negative corner portion 251. In the electrode assembly 1, the next last negative straight portion 260 is opposite to the last negative straight portion 250, and is the outermost part of the negative electrode plate 20.

As mentioned above, the negative electrode plate 20 is typically in the form of a double-sided electrode plate. Both sides of the current collector of the negative electrode plate are coated with an active material layer. Therefore, both sides of the next last negative straight portion 260 of the negative electrode plate 20 are also coated with the active material layer. Because the next last negative straight portion 260 is the outermost part of the negative electrode plate 20, the active material layer on the outer side of the next last negative straight portion 260 is directly oriented toward the external environment and corresponds to no positive electrode, thereby resulting in failure to utilize the active material layer on the outer side of the next last negative straight portion 260, and resulting in a waste.

In view of the above problem, the outermost positive electrode plate in the positive electrode plate 10 according to this application may further include a second outermost positive electrode plate 450. The second outermost positive electrode plate 450 is disposed at the outer side of the next last negative straight portion 260 along a radial direction perpendicular to the winding axis, as shown in FIG. 1 and FIG. 2.

The second outermost positive electrode plate 450 may be a single-sided electrode plate. In other words, only one side of the current collector of the electrode plate is coated with an active material layer. For example, the active material layer is applied on the inner side of the current collector of the second outermost positive electrode plate 450 (that is, on the side oriented toward the next last negative straight portion 260). In a case that the second outermost positive electrode plate 450 is disposed outside the next last negative straight portion 260, the active material layer on the inner side of the current collector of the second outermost positive electrode plate 450 is opposite to the active material layer on the outer side of the next last negative straight portion 260. In this way, the active material layer on the outer side of the next last negative straight portion 260 can be utilized rather than wasted, thereby improving the energy density of the electrode assembly 1 effectively.

According to some embodiments of this application, the second outermost positive electrode plate 450 includes a current collector and an active material layer. The current collector may include a metal layer. The active material layer is applied on one side of the current collector and covers the metal layer, the side being oriented toward the next last negative straight portion 260. The active material layer on the side, oriented toward the next last negative straight portion 260, of the current collector of the second outermost positive electrode plate 450, is opposite to the next last negative straight portion 260, and specifically, opposite to the outward-facing active material layer on the next last negative straight portion 260.

Optionally, the current collector may be a composite current collector containing a metal layer and a base film layer. The metal layer is disposed on a side of the base film layer, the side being oriented toward the next last negative straight portion 260. The active material layer is applied onto a side of the base film layer and covers the metal layer, the side being oriented toward the next last negative straight portion 260. The active material layer on the side, oriented toward the next last negative straight portion 260, of the current collector of the second outermost positive electrode plate 450, is opposite to the next last negative straight portion 260, and specifically, opposite to the outward-facing active material layer on the next last negative straight portion 260.

In forming the second outermost positive electrode plate 450 by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the second outermost positive electrode plate 450 is exposed, thereby reducing the risk of lithium plating.

According to some embodiments of this application, optionally, as shown in FIG. 1 and FIG. 2, the length of the second outermost positive electrode plate 450 may be designed as greater than a half of the circumference of the winding needle but less than the width of the electrode assembly 1. The "length" here means a dimension measured along a left-right direction on the page of FIG. 1 and FIG. 2. The "width of the electrode assembly" is also a dimension of the electrode assembly measured along the left-right direction on the page of FIG. 1 and FIG. 2, and is a width of the electrode assembly in a conventional sense in this field.

The length of the second outermost positive electrode plate 450 is greater than a half of the circumference of the winding needle but less than the width of the electrode assembly 1, or the length of the second outermost positive electrode plate 450 may be greater than the length of the next last negative straight portion 260 but less than the width of the electrode assembly 1, thereby maximally covering the next last negative straight portion 260 to maximally utilize the outward-facing active material layer on the next last negative straight portion 260 and ensure a relatively high energy density of the electrode assembly 1.

According to some embodiments of this application, optionally, the second outermost positive electrode plate 450 may include two end surfaces and four side surfaces. The two end surfaces are opposite to each other. One of the two end surfaces is overlaid with an active material layer oriented toward the next last negative straight portion 260. At least 95% of an area of at least three of the four side surfaces is overlaid with an insulation layer.

The ceramic slurry used for preparing the insulation layer includes at least a ceramic material, a binder, and a solvent. The mass percent of the ceramic material is 10 wt % to 70 wt %, the mass percent of the binder is 1 wt % to 5 wt %, and the viscosity of the ceramic slurry is 100 to 1000 mPa·s.

The ceramic material is one of hydrated alumina, magnesium oxide, silicon carbide, or silicon nitride. The binder is a combination of one or more of polyvinylidene difluoride, polyacrylate ester, methyl acrylate, ethyl acrylate, 2-methyl methacrylate, or 2-ethyl methacrylate.

The solvent is N-methyl-pyrrolidone. The ceramic material is hydrated alumina. The binder is polyvinylidene difluoride.

At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

According to some embodiments of this application, optionally, as shown in FIG. 3 to FIG. 6, the negative electrode plate 20 includes a last negative straight portion 250 extending to the hindmost winding end along the winding direction. The last negative straight portion 250 is the outermost part of the negative electrode plate 20 in the electrode assembly 1. The negative electrode plate 20 further includes a next last negative straight portion 260 extending along the winding direction. The next last negative straight portion 260 is connected to the last negative straight portion 250 by a last negative corner portion 251. In the electrode assembly 1, the next last negative straight portion 260 is opposite to the last negative straight portion 250, and is the outermost part of the negative electrode plate 20.

As mentioned above, the negative electrode plate 20 is typically in the form of a double-sided electrode plate. Both sides of the current collector of the negative electrode plate are coated with an active material layer. Therefore, both sides of the last negative straight portion 250 and the next last negative straight portion 260 of the negative electrode plate 20 are also coated with the active material layer. Because the last negative straight portion 250 and the next last negative straight portion 260 are the outermost part of the negative electrode plate 20, the active material layers on the outer sides of the last negative straight portion 250 and the next last negative straight portion 260 are directly oriented toward the external environment and corresponds to no positive electrode, thereby resulting in failure to utilize the active material layers on the outer sides of the last negative straight portion 250 and the next last negative straight portion 260, and resulting in a waste.

In view of the above problem, the positive electrode plate 10 may include a long-sheet positive electrode plate 460.

The long-sheet positive electrode plate 460 is disposed at the outermost coil of the electrode assembly along a radial direction perpendicular to the winding axis, for example, disposed at the outer sides of the last negative straight portion 250 and the next last negative straight portion 260, as shown in FIG. 3 to FIG. 6.

The long-sheet positive electrode plate 460 may be a single-sided electrode plate. In other words, only one side of the current collector of the electrode plate is coated with an active material layer. For example, the active material layer is applied on the inner side of the current collector of the long-sheet positive electrode plate 460 (that is, on the side oriented toward the last negative straight portion 250 and the next last negative straight portion 260). In a case that the long-sheet positive electrode plate 460 is disposed outside the last negative straight portion 250 and the next last negative straight portion 260, the active material layer on the inner side of the current collector of the long-sheet positive electrode plate 460 is opposite to the active material layers on the outer sides of the last negative straight portion 250 and the next last negative straight portion 260. In this way, the active material layers on the outer sides of the last negative straight portion 250 and the next last negative straight portion 260 can be utilized rather than wasted, thereby improving the energy density of the electrode assembly 1 effectively.

According to some embodiments of this application, the long-sheet positive electrode plate 460 includes a current collector and an active material layer. The current collector may include a metal layer. The active material layer is applied on one side of the current collector and covers the metal layer, the side being oriented toward the last negative straight portion 250 and the next last negative straight portion 260. The active material layer on the side, oriented toward the last negative straight portion 250 and the next last negative straight portion 260, of the current collector of the long-sheet positive electrode plate 460, is opposite to the last negative straight portion 250 and the next last negative straight portion 260, and specifically, opposite to the outward-facing active material layer on the last negative straight portion 250 and the next last negative straight portion 260.

Optionally, the current collector may be a composite current collector containing a metal layer and a base film layer. The metal layer is disposed on a side of the base film layer, the side being oriented toward the last negative straight portion 250 and the next last negative straight portion 260. The active material layer is applied onto a side of the base film layer and covers the metal layer, the side being oriented toward the last negative straight portion 250 and the next last negative straight portion 260. The active material layer on the side, oriented toward the last negative straight portion 250 and the next last negative straight portion 260, of the current collector of the long-sheet positive electrode plate 460, is opposite to the last negative straight portion 250 and the next last negative straight portion 260, and specifically, opposite to the outward-facing active material layer on the last negative straight portion 250 and the next last negative straight portion 260.

In forming the long-sheet positive electrode plate 460 by cutting, only the base film layer needs to be cut. In this way, on the one hand, the generation of metal burrs is avoided by avoiding exposure of the metal layer, thereby preventing the risk that the metal burrs pierce the separator. On the other hand, the cutting of the active material layer is avoided, thereby reducing the risk of detachment of the active material layer. The base film layer may be non-conductive. In this way, after completion of cutting, no conductive part of the long-sheet positive electrode plate 460 is exposed, thereby reducing the risk of lithium plating.

According to some embodiments of this application, optionally, as shown in FIG. 3 to FIG. 6, the length of the long-sheet positive electrode plate 460 may be designed as greater than a half of the circumference of the winding needle but less than the width of the electrode assembly 1. The "length" here means a dimension measured along a left-right direction on the page of FIG. 3 to FIG. 6. The "width of the electrode assembly" is also a dimension of the electrode assembly measured along the left-right direction on the page of FIG. 3 to FIG. 6, and is a width of the electrode assembly in a conventional sense in this field.

The length of the long-sheet positive electrode plate 460 may be greater than or equal to the circumference of the winding needle but less than twice the width of the electrode assembly 1, or the length of the long-sheet positive electrode plate 460 may be greater than a sum of lengths of the last negative straight portion 250 and the next last negative straight portion 260 but less than twice the width of the electrode assembly 1, thereby maximally covering the last negative straight portion 250 and the next last negative straight portion 260 to maximally utilize the outward-facing active material layers on the last negative straight portion 250 and the next last negative straight portion 260 and ensure a relatively high energy density of the electrode assembly 1.

According to some embodiments of this application, optionally, the long-sheet positive electrode plate 460 may include two end surfaces and four side surfaces. The two end surfaces are opposite to each other. One of the two end surfaces is overlaid with an active material layer oriented toward the last negative straight portion 250 and the next last negative straight portion 260. At least 95% of an area of at least three of the four side surfaces is overlaid with an insulation layer.

The ceramic slurry used for preparing the insulation layer includes at least a ceramic material, a binder, and a solvent. The mass percent of the ceramic material is 10 wt % to 70 wt %, the mass percent of the binder is 1 wt % to 5 wt %, and the viscosity of the ceramic slurry is 100 to 1000 mPa·s.

The ceramic material is one of hydrated alumina, magnesium oxide, silicon carbide, or silicon nitride. The binder is a combination of one or more of polyvinylidene difluoride, polyacrylate ester, methyl acrylate, ethyl acrylate, 2-methyl methacrylate, or 2-ethyl methacrylate. The solvent is N-methyl-pyrrolidone. The ceramic material is hydrated alumina. The binder is polyvinylidene difluoride.

At least 95% of an area of at least three of the four side surfaces is overlaid with an insulation layer. In this way, the insulation layer can wrap the burrs formed on the side surfaces to prevent a short circuit caused by the burrs and improve the safety performance of the electrode assembly and the battery.

Figure 3:
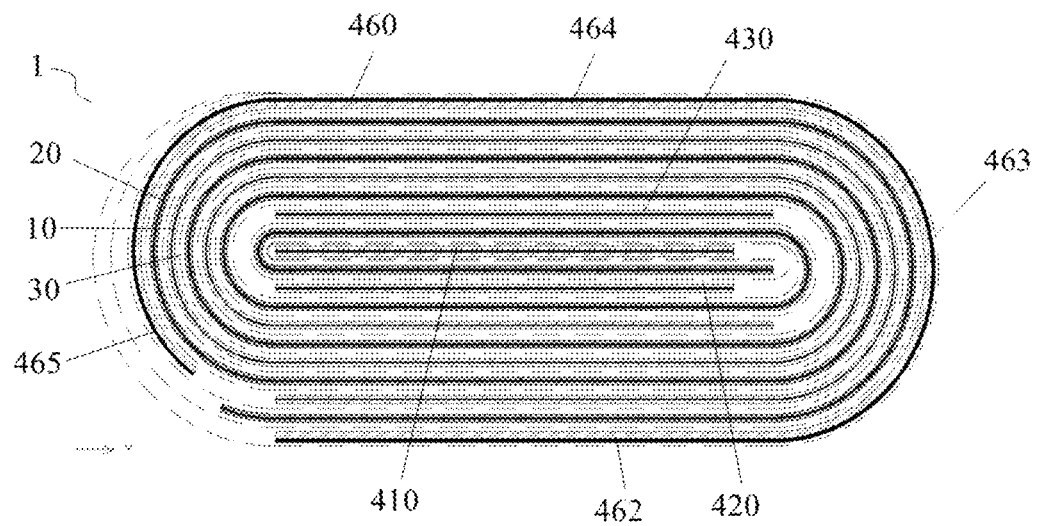
FIG. 3 is a schematic structural diagram of an electrode assembly according to some embodiments of this application.

As shown in FIG. 3, which shows an embodiment of a positive electrode plate 10 that includes a first positive electrode plate 410, a second positive electrode plate 420, a third positive electrode plate 430, and a long-sheet positive electrode plate 460, the long-sheet positive electrode plate 460 includes a last positive straight portion 462 at a hindmost winding end and a next last positive straight portion 464 at a next hindmost winding end. The last positive straight portion 462 is connected to the next last positive straight portion 464 by a last positive corner portion 463. In addition, a next last positive corner portion 465 extends from the next last positive straight portion 464 along a direction opposite to the winding direction. The next last positive corner portion 465 extends until slight spacing is formed apart from the last negative straight portion 250. On the one hand, this arrangement avoids a possible risk of lithium plating caused by the overhanging structure. On the other hand, this arrangement avoids a risk of a short circuit caused by a lap-joint between one side of the metallic current collector of the outermost positive electrode and the negative electrode.

Figure 4:
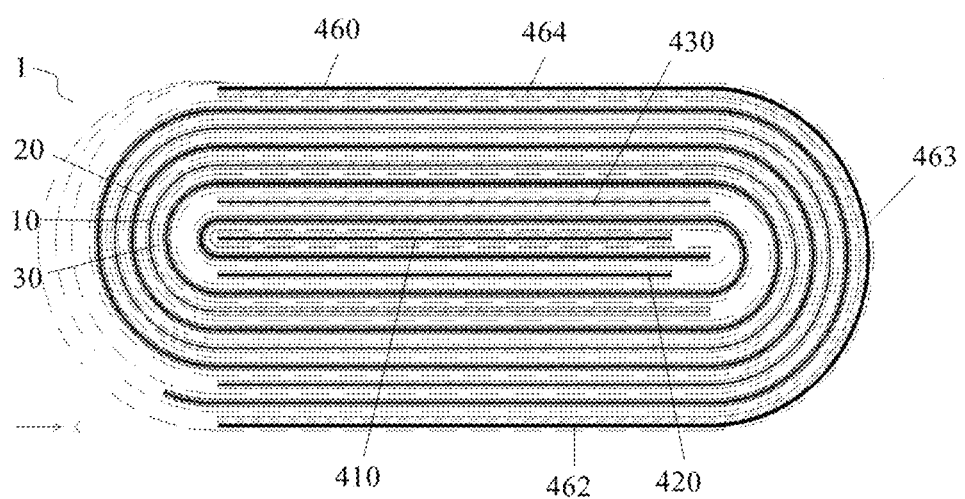
FIG. 4 is a schematic structural diagram of an electrode assembly according to some embodiments of this application.

As shown in FIG. 4, which shows an embodiment of a positive electrode plate 10 that includes a first positive electrode plate 410, a second positive electrode plate 420, a third positive electrode plate 430, and a long-sheet positive electrode plate 460, the long-sheet positive electrode plate 460 includes a last positive straight portion 462 at a hindmost winding end and a next last positive straight portion 464 at a next hindmost winding end. The last positive straight portion 462 is connected to the next last positive straight portion 464 by a last positive corner portion 463. Different from FIG. 3, in the embodiment in FIG. 4, no next last positive corner portion 465 extends from the next last positive straight portion 464 along a direction opposite to the winding direction.

Figure 5:
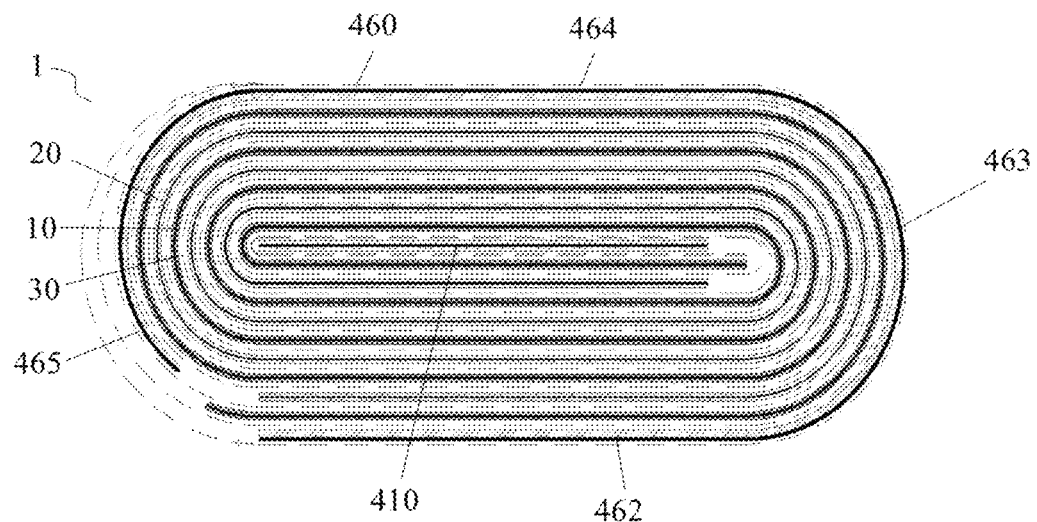
FIG. 5 is a schematic structural diagram of an electrode assembly according to some embodiments of this application.

As shown in FIG. 5, which shows an embodiment of a positive electrode plate 10 that includes a first positive electrode plate 410 and a long-sheet positive electrode plate 460, the long-sheet positive electrode plate 460 includes a last positive straight portion 462 at a hindmost winding end and a next last positive straight portion 464 at a next hindmost winding end. The last positive straight portion 462 is connected to the next last positive straight portion 464 by a last positive corner portion 463. In addition, a next last positive corner portion 465 extends from the next last positive straight portion 464 along a direction opposite to the winding direction. The next last positive corner portion 465 extends until slight spacing is formed apart from the last negative straight portion 250. On the one hand, this arrangement avoids a possible risk of lithium plating caused by the overhanging structure. On the other hand, this arrangement avoids a risk of a short circuit caused by a lap-joint between one side of the metallic current collector of the outermost positive electrode and the negative electrode.

Figure 6:
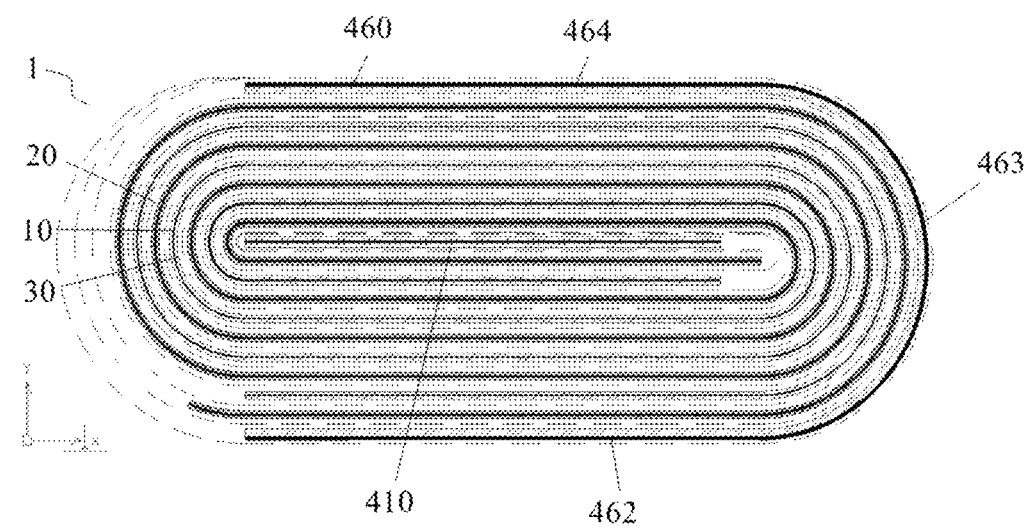
FIG. 6 is a schematic structural diagram of an electrode assembly according to some embodiments of this application.

As shown in FIG. 6, which shows an embodiment of a positive electrode plate 10 that includes a first positive electrode plate 410 and a long-sheet positive electrode plate 460, the long-sheet positive electrode plate 460 includes a last positive straight portion 462 at a hindmost winding end and a next last positive straight portion 464 at a next hindmost winding end. The last positive straight portion 462 is connected to the next last positive straight portion 464 by a last positive corner portion 463. Different from FIG. 5, in the embodiment in FIG. 6, no next last positive corner portion 465 extends from the next last positive straight portion 464 along a direction opposite to the winding direction.

According to some embodiments of this application, a battery is further provided. The battery includes a housing and the electrode assembly disclosed above. The electrode assembly is disposed in the housing.

A process for preparing the foregoing battery is briefly described below.

First, a positive electrode plate and a negative electrode plate continuously coated with an active material layer are produced by slurry-mixing, coating, and cold-pressing. After being subjected to die-cutting and slitting processes, a continuous positive electrode plate and a continuous negative electrode plate that primarily assume a jelly-roll structure are formed. In other words, a continuous negative electrode plate, and a continuous positive electrode plate as a part of a positive electrode plate, are formed.

A single-sheet positive electrode plate may be produced by die-cutting and slitting the continuous positive electrode plate resulting from the above steps, or may be produced by other separate processes of slurry-mixing, coating, cold-pressing, die-cutting, and slitting.

When the single-sheet positive electrode is produced separately, constituents of the active material, mass percentages of constituents of the slurry, and/or the coating weight of the single-sheet positive electrode plate may be different from those of the continuous positive electrode plate in the main region of the electrode assembly as long as the cell balance (CB) value is greater than 1.

When the single-sheet positive electrode is produced separately, the current collector of the single-sheet positive electrode plate may be different from that of the continuous positive electrode plate in the main region, and may be, for example, a metal-layer current collector, or a composite current collector compounded of a metal layer and a polymer film layer.

The single-sheet positive electrode plates are cut, and then stacked in groups depending on the position of each electrode plate in the bare cell. At least three of the four cut side surfaces of the single-sheet positive electrode plate are coated with an insulation layer to ensure that at least 95% of the area of each side surface is covered with the insulation layer, so as to avoid exposure of edge aluminum or/and burrs of the cut surfaces.

The single-sheet positive electrode plate is aligned and combined with a continuous separator by adhesive or hot-pressing to form a separator composite of a partial positive electrode.

The separator composite is wound together with another continuous separator, a die-cut continuous positive electrode plate, and a negative electrode plate to form a bare cell structure.

Alternatively, the bare cell structure may be formed by winding a combined structure, where the combined structure includes two continuous separators, a continuous positive electrode plate, and a continuous negative electrode plate composite compounded of a partial positive electrode and a separator.

The continuous negative electrode plate composite compounded of a partial positive electrode and a separator is formed by bonding or hot-pressing one side of a single-sheet separator onto a single-sheet positive electrode plate and the other side of the single-sheet separator onto a continuous negative electrode plate by alignment. The cut edges of the single-sheet positive electrode plate except a tab region do not exceed any edges of the single-sheet separator, so as to avoid direct contact between the positive electrode plate and the negative electrode plate.

The single-sheet positive electrode plate located in the inner coil of the jelly-roll electrode assembly is a structure overlaid with an active material layer on both sides, and is located only in the straight portion of the jelly-roll cell. The length of each single positive electrode plate does not exceed the length of the negative straight portion corresponding to either side of the positive electrode plate.

The single-sheet positive electrode plate located at the outermost coil of the jelly-roll cell is a structure overlaid with an active material layer on a single side. A side, overlaid with the active material layer, of the positive electrode plate, is oriented toward the center of the jelly roll, and corresponds to the partial active material layer on the outer side of the outermost coil of the continuous negative electrode plate. The single-sheet positive electrode plate located outermost may be one of two short-sheet structures located only in the straight portions, and is of a length not greater than the corresponding negative straight portion; or may be a long-sheet structure that includes a corner portion, and is of a length no greater than a sum of lengths of the two straight portions and two corner portions at the outermost coil of the negative electrode plate.

To illustrate the technical advantages of the technical solutions hereof over the related art, some embodiments of this application are compared with the comparative embodiments in the related art below.

The following embodiments of this application are used for comparison:

First embodiment: The positive electrode plate includes 43 layers, and the negative electrode plate includes 44 layers. The positive electrode plate includes 3 single-sheet positive electrode plates (that is, the first positive electrode plate 410, the second positive electrode plate 420, and the third positive electrode plate 430, as shown in FIG. 2) located at the inner coil and a continuous 40-layer positive electrode plate. The negative electrode plate is a continuous 44-layer structure. The length of the first single-sheet positive electrode plate located innermost is less than a half of the circumference of the winding needle. Each of the lengths of the second and third single-sheet positive electrode plates located innermost is equal to a half of the circumference of the winding needle. All the single-sheet positive electrode plates are located in the straight section of the electrode assembly, and are coated with an active material layer on both sides.

Second embodiment: The positive electrode plate includes 45 layers, and the negative electrode plate includes 44 layers. The positive electrode plate further includes two single-sided single-sheet positive electrode plates (that is, the first outermost positive electrode plate 440 and the second outermost positive electrode plate 450 shown in FIG. 1 and FIG. 2) at the outermost coil of the electrode assembly in addition to the positive electrode plates mentioned in the first embodiment. The sides, coated with the active material layer, of the two single-sided single-sheet positive electrode plates correspond to the active material layers of the next last negative straight portion 260 and the last negative straight portion 250, respectively. Each of the lengths of the two single-sided single-sheet positive electrode plates is greater than a half of the circumference of the winding needle but not greater than the overall width of the electrode assembly.

The following first comparative embodiment is used for comparison: The electrode assembly is formed by winding a continuous double-sided positive electrode plate, a continuous double-sided negative electrode plate, and a separator. The positive electrode plate includes 42 layers, and the negative electrode plate includes 44 layers.

The volumetric energy densities of the batteries assembled according to the above embodiments and comparative embodiment are compared as follows. In addition, the innermost corner clearance is set to 2 mm, and the batteries are charged and discharged at a high current rate for several cycles. The results of lithium plating at the corner and the short circuits caused by the lithium dendrites piercing the separator are recorded in the table below:

| Group | Number of layers of positive electrode | Innermost corner | Volumetric energy density | Lithium plating detected at innermost corner | Short circuit caused by lithium dendrites at corner |
|---|---|---|---|---|---|
| First Embodiment | 43 double-sided | Anode-wrapped-in-anode | 101.3% | No | No |
| Second Embodiment | 43 double-sided + 2 single-sided | Anode-wrapped-in-anode | 102.5% | No | No |
| First comparative embodiment | 42 double-sided | Anode-wrapped-in-cathode | 100% | Yes | Yes |

As can be seen from the above results, the volumetric energy density of the electrode assembly according to this application is increased by 1.3% after the active material layer of the innermost negative electrode plate is utilized. No anode-wrapped-in-cathode structure is disposed at the innermost corner. Therefore, even if the corner clearance is 2 mm, no lithium plating occurs at the corner, and no short-circuit is caused by the lithium dendrites piercing the separator at the corner, as shown in the first embodiment. Further, the volumetric energy density is increased by 2.5% if the active material layer on the outer side of the outermost coil of the negative electrode plate is utilized, as in the second embodiment, and if two single-sided positive electrode plates are added at the outermost coil. Therefore, the technical solution of this application not only improves the energy density of the electrode assembly, but also solves the problem of lithium plating at the inner corner clearance, thereby further improving the safety of the lithium-ion battery and the electrode assembly thereof.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. An electrode assembly, comprising a negative electrode plate, a positive electrode plate, and a separator disposed between the negative electrode plate and the positive electrode plate, wherein:
the negative electrode plate, the positive electrode plate, and the separator are wound together around a winding axis to form the electrode assembly;
the negative electrode plate is a continuous negative electrode plate extending from a foremost winding end to a hindmost winding end along a winding direction, the negative electrode plate comprising a first straight portion, a first curved portion, a second straight portion, a second curved portion, a third straight portion, a third curved portion, and a fourth straight portion connected in sequence, the first straight portion, the second straight portion, the third straight portion, and the fourth straight portion being parallel with each other; and
the positive electrode plate comprises:
a continuous positive electrode plate disposed along the winding direction;
a first single-sheet positive electrode plate disposed along the winding direction apart from the continuous positive electrode plate and disposed between the first straight portion and the second straight portion of the negative electrode plate;
a second single-sheet positive electrode plate disposed along the winding direction apart from the continuous positive electrode plate and disposed between the first straight portion and the third straight portion of the negative electrode plate; and
a third single-sheet positive electrode plate disposed along the winding direction apart from the continuous positive electrode plate and disposed between the second straight portion and the fourth straight portion of the negative electrode plate, the first single-sheet positive electrode plate, the second single-sheet positive electrode plate, and the third single-sheet positive electrode plate being not connected with each other along the winding direction but being parallel with each other.

2. The electrode assembly according to claim 1, wherein:
the positive electrode plate further comprises a long-sheet positive electrode plate located downstream of the continuous positive electrode plate along the winding direction.

3. The electrode assembly according to claim 1, wherein:
a length of the first single-sheet positive electrode plate is less than a length of the second straight portion; or
the first single-sheet positive electrode plate comprises two end surfaces and four side surfaces, the two end surfaces are opposite to the first straight portion and the second straight portion respectively, and at least 95% of an area of at least three of the four side surfaces is overlaid with an insulation layer.

4. The electrode assembly according to claim 1, wherein:
a length of the second single-sheet positive electrode plate is less than a length of the second straight portion; or
the second single-sheet positive electrode plate comprises two end surfaces and four side surfaces, the two end surfaces are opposite to the first straight portion and the third straight portion respectively, and at least 95% of an area of at least three of the four side surfaces is overlaid with an insulation layer.

5. The electrode assembly according to claim 1, wherein:
a length of the third single-sheet positive electrode plate is less than a length of the second straight portion; or
the third single-sheet positive electrode plate comprises two end surfaces and four side surfaces, the two end surfaces are opposite to the second straight portion and the fourth straight portion respectively, and at least 95% of an area of at least three of the four side surfaces is overlaid with an insulation layer.

6. The electrode assembly according to claim 1, wherein the positive electrode plate further comprises an outermost single-sheet positive electrode plate, the outermost single-sheet positive electrode plate is disposed at an outermost coil of the electrode assembly along a radial direction perpendicular to the winding axis.

7. The electrode assembly according to claim 6, wherein the continuous negative electrode plate further comprises a last straight portion extending to the hindmost winding end along the winding direction, the outermost single-sheet positive electrode plate comprises a first outermost positive electrode plate, and the first outermost positive electrode plate is disposed outside the last straight portion along the radial direction perpendicular to the winding axis.

8. The electrode assembly according to claim 7, wherein:
a length of the first outermost positive electrode plate is greater than a length of the last straight portion but less than a width of the electrode assembly; or
the first outermost positive electrode plate comprises two end surfaces and four side surfaces, the two end surfaces are opposite to each other, one of the two end surfaces is overlaid with an active material layer, the active material layer is oriented toward the last straight portion, and at least 95% of an area of at least three of the four side surfaces is overlaid with an insulation layer.

9. The electrode assembly according to claim 7, wherein the continuous negative electrode plate further comprises a next last straight portion extending along the winding direction, the next last straight portion is connected to the last straight portion by a fourth curved portion, the outermost single-sheet positive electrode plate further comprises a second outermost positive electrode plate, and the second outermost positive electrode plate is disposed outside the next last straight portion along the radial direction perpendicular to the winding axis.

10. The electrode assembly according to claim 9, wherein:
a length of the second outermost positive electrode plate is greater than a length of the next last straight portion but less than a width of the electrode assembly; or
the second outermost positive electrode plate comprises two end surfaces and four side surfaces, the two end surfaces are opposite to each other, one of the two end surfaces is overlaid with an active material layer, the active material layer is oriented toward the next last straight portion, and at least 95% of an area of at least three of the four side surfaces is overlaid with an insulation layer.

11. The electrode assembly according to claim 1, wherein the positive electrode plate further comprises a long-sheet positive electrode plate disposed at an outermost coil of the electrode assembly along a radial direction perpendicular to the winding axis.

12. The electrode assembly according to claim 11, wherein the continuous negative electrode plate further comprises a last straight portion extending to the hindmost winding end along the winding direction, and a next last straight portion extending along the winding direction, the next last straight portion is connected to the last straight portion by a fourth curved portion, and the long-sheet positive electrode plate is disposed outside the last straight portion and the next last straight portion along the radial direction perpendicular to the winding axis.

13. The electrode assembly according to claim 12, wherein:
a length of the long-sheet positive electrode plate is greater than a sum of lengths of the last straight portion and the next last straight portion but less than twice a width of the electrode assembly; or
the long-sheet positive electrode plate comprises two end surfaces and four side surfaces, the two end surfaces are opposite to each other, one of the two end surfaces is overlaid with an active material layer, the active material layer is oriented toward the last straight portion and the next last straight portion, and at least 95% of an area of at least three of the four side surfaces is overlaid with an insulation layer.

14. A battery cell, comprising:
a housing; and
the electrode assembly according to claim 1, wherein the electrode assembly is disposed in the housing.

15. A battery, comprising the battery cell according to claim 14.

16. An electrical device, comprising the battery according to claim 15 configured to provide electrical energy for the electrical device.

17. An electrical device, comprising the battery cell according to claim 14 configured to provide electrical energy for the electrical device.

* * * * *